United States Patent [19]

Anderson et al.

[11] 4,161,365
[45] Jul. 17, 1979

[54] NEGHOLD ASSEMBLY FOR PHOTOGRAPHIC PRINTER

[75] Inventors: Richard D. Anderson, Maple Grove; John A. Wedel, Crystal, both of Minn.

[73] Assignee: Pako Corporation, Minneapolis, Minn.

[21] Appl. No.: 868,080

[22] Filed: Jan. 9, 1978

[51] Int. Cl.² .............................................. G03B 27/62
[52] U.S. Cl. ...................................... 355/75; 352/224; 352/226
[58] Field of Search .......................... 355/75, 76, 122; 352/224, 226

[56] References Cited

U.S. PATENT DOCUMENTS

| | | | |
|---|---|---|---|
| 2,263,025 | 11/1941 | Young, Jr. et al. | 355/76 |
| 2,329,690 | 9/1943 | Bolton | 355/76 |
| 2,507,161 | 5/1950 | Hughey | 355/76 |
| 2,699,703 | 1/1955 | Mourfield | 355/76 X |

FOREIGN PATENT DOCUMENTS 945594  1/1964  United Kingdom ...................... 355/76

Primary Examiner—Richard A. Wintercorn
Attorney, Agent, or Firm—Kinney, Lange, Westman and Fairbairn

[57] ABSTRACT

The neghold assembly of the present invention is used in photographic printers which do not have an automatic film advance system. The neghold assembly includes a transport base, a top insert holder, first and second aperture insert plates which are held in the transport base and the top insert holder, and a handle which is connected to the top insert holder. The first and second aperture insert plates are a set which have mating apertures which correspond to the desired film size. When a different size film is to be used, another set of first and second aperture insert plates having the appropriate size apertures are inserted.

27 Claims, 8 Drawing Figures

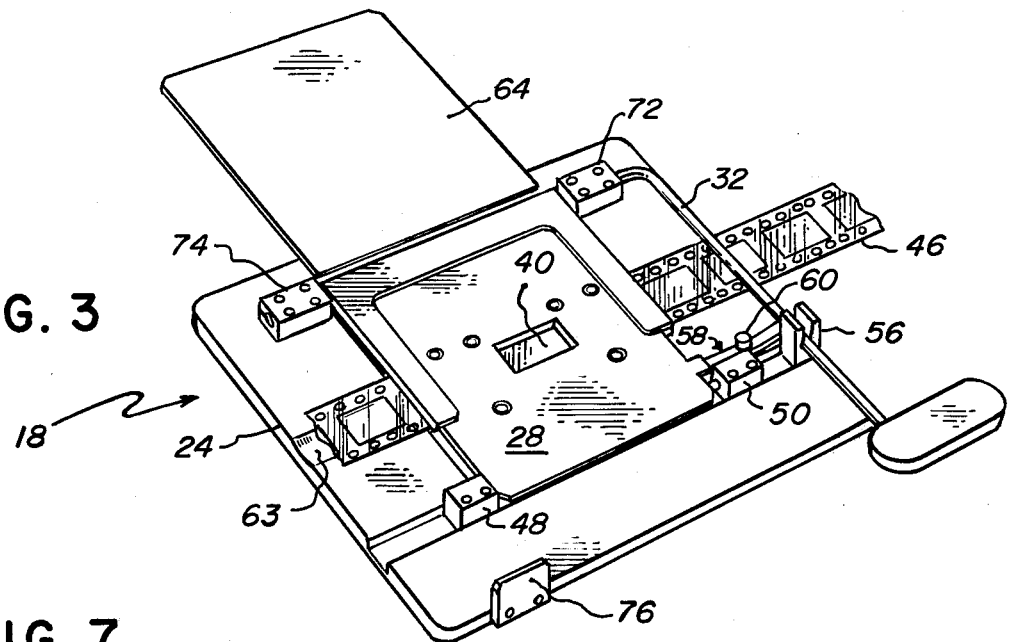
FIG. 3
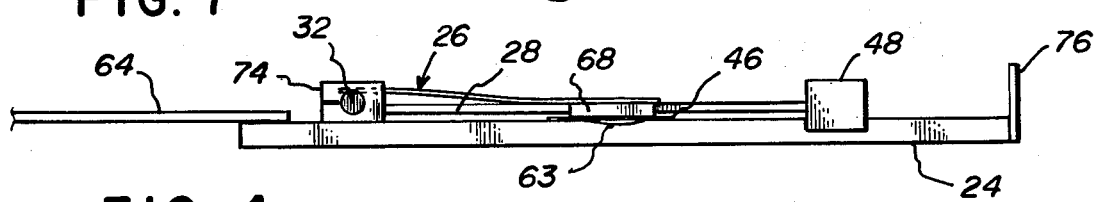
FIG. 7
FIG. 4
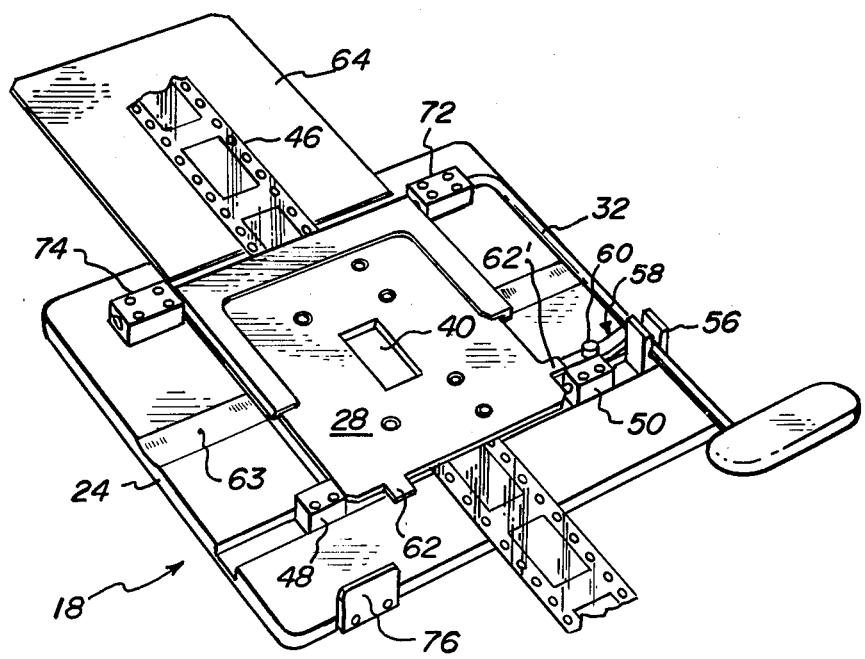

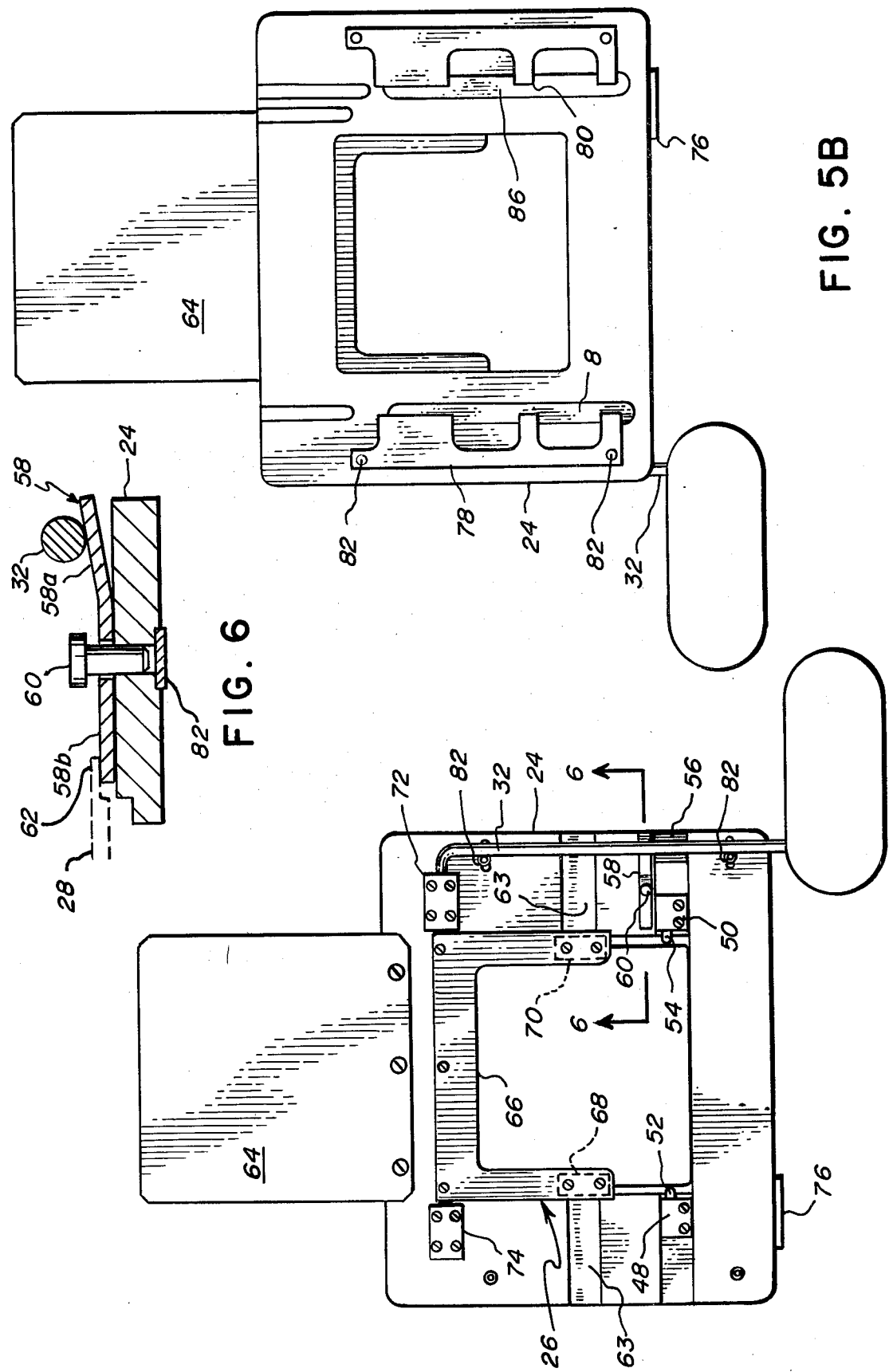

NEGHOLD ASSEMBLY FOR PHOTOGRAPHIC PRINTER

BACKGROUND OF THE INVENTION

The present invention is concerned with photographic printing systems. In particular, the present invention is an improved neghold system for photographic printers which do not have automatic film advance mechanisms.

Photographic printers produce color or black and white prints from photographic film originals (generally negatives). High intensity light is passed through the photographic film and imaged on a photosensitive medium (generally photographic print paper). The photographic emulsion layers on the photosensitive medium are exposed and subsequently processed to produce a print (or transparency) of the scene contained in the photographic film original.

Photographic processing centers typically process film from many customers. General purpose printers are often used in these processing centers in order to produce color or black and white prints from a wide range of negative sizes which may include, for example, 110, 120, 126, 70mm, and 2¼ by 2¾ inch negative sizes. The desired prints may have 10 or more different sizes and may be either with or without borders. In addition, each negative may have two possible orientations during printing (i.e. the film may move from left to right, or from front to back through the printer).

One critical component of a general purpose printer is the neghold assembly, which holds the photographic film at the print gate where high intensity light is passed through the film and imaged onto the photosensitive medium. The neghold assembly must hold the film securely and must maintain the optical alignment of the film with respect to the remainder of the printer.

In many general purpose photographic printers, the photographic film is fed manually to the print gate. The film may be in the form of a long strip of material made from shorter strips which are spliced together for processing, or may be in short strips of approximately four frames each. This latter situation is generally the case when prints are being reordered by the customer. In either case, ease of positioning of the film in the neghold is very important.

Finally, because the large number of film sizes must be accomodated, and because each film size has two possible printing orientation, the neghold for each film size and orientation must be relatively low cost. This requirement has often led to significant compromises in the reliability of film holders and in the ease of positioning film within the neghold. Improvements in neghold assemblies used in general purpose printers are needed.

SUMMARY OF THE INVENTION

The neghold assembly of the present invention provides highly accurate and reliable clamping of the photographic film, is capable of handling a large number of different sizes, but does not require excessive cost. The neghold assembly of the present invention includes a transport base, a top insert holder, a handle, and first and second insert plates which are held by the transport base and the top insert holder. A set of first and second insert plates is provided for each desired film size. The handle is operatively connected to the top insert holder for sselectively pivoting the top insert holder to either a clamping position in which the insert plates are clamped together, or to an open position in which the insert plates are separated.

BRIEF DESCRIPTION OF THE DRAWINGS

FIG. 3 is a perspective view of the neghold assembly with the plates closed and with the film inserted between the plates.

FIG. 4 is a perspective view of the neghold assembly closed, with film between the plates, and with the insert aperture plates oriented to provide front-to-rear film orientation.

FIGS. 5A and 5B are top and bottom views of the transport plate, top insert holder, and handle.

FIG. 6 is a cross-sectional view of the insert lift lever taken along line 6—6 of FIG. 5A.

FIG. 7 shows a side view of the top insert holder in clamping position.

DETAILED DESCRIPTION OF THE PREFERRED EMBODIMENTS

Figure 1:
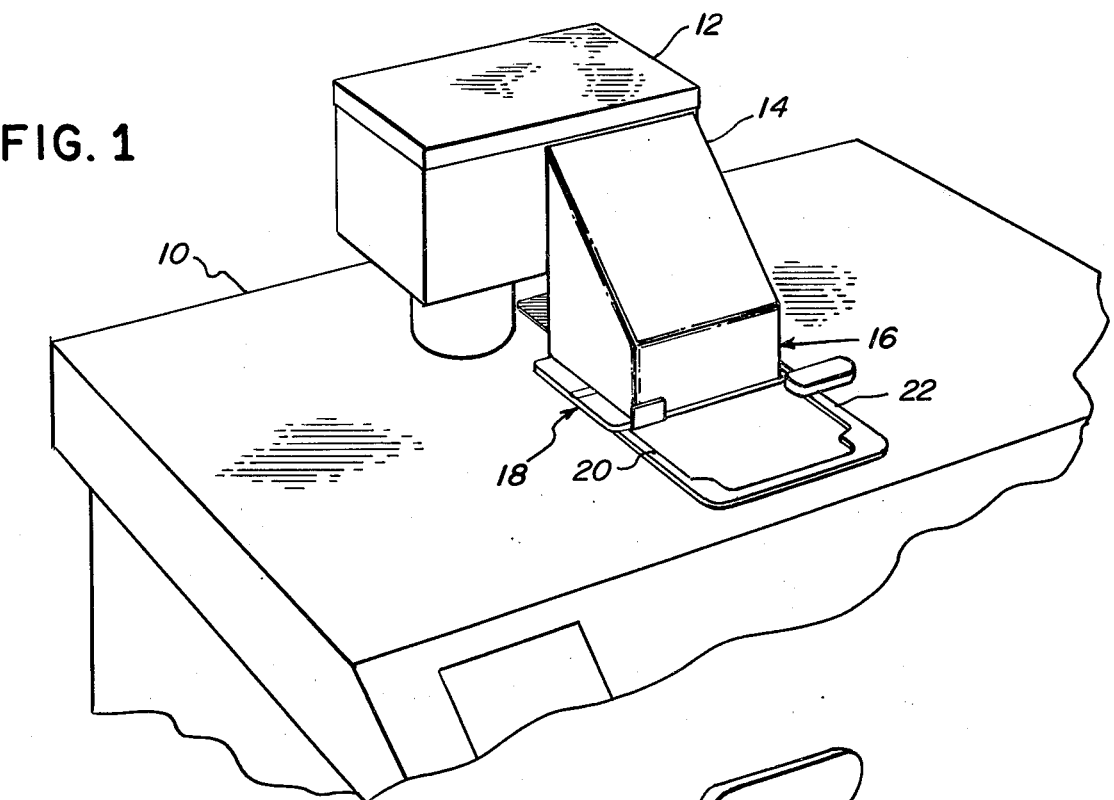
FIG. 1 is a perspective view of a printer in which the improved neghold assembly of the present invention has been used to advantage.

The improved neghold assembly of the present invention may be used in various forms with a variety of general purpose photographic printers. FIG. 1 shows a portion of one printer, the BC 24 printer manufactured by Pako Corporation, with which the improved neghold assembly of the present invention has been used to advantage. The printer shown in FIG. 1 is generally similar to the printer described in detail in a co-pending application by Baert and Bowe (Ser. No. 776,876 filed May 11, 1977) which is assigned to the same assignee as the present invention. It has been found that the neghold assembly of the present invention provides significant advantages over the neghold assembly illustrated in this co-pending patent application.

Printer 10 of FIG. 1 includes a lamphouse 12 containing high intensity print lamps (not shown) which generate the light used for photographic printing. The light from lamphouse 12 is diffused and directed downward by mixing chamber assembly 14 to a print gate 16 which is located immediately below the bottom surface of mixing chamber assembly 14. The photographic film original is held by neghold assembly 18 at print gate 16, and the light is directed through the photographic film and imaged by focusing optics onto a photosensitive medium located within the body of printer 10.

Printer 10 of FIG. 1 also includes a preview gate which is positioned immediately in front of print gate 16. Guide rails 20 and 22 guide neghold assembly 18 as it slides between a position over the preview station and a position over the print gate 16.

The neghold assembly should meet several requirements. First, the film must be clamped and held securely and in proper optical alignment at the print gate. Second, the neghold assembly must slide reliably on guide rails 20 and 22 without binding and without requiring undue effort on the part of the operator. Third, the neghold assembly must be capable of accomodating a variety of different film sizes and both left to right and front to rear orientation of the film. Fourth, the neghold assembly should not scratch the film while the film is being held or manually advanced. Fifth, the neghold assembly preferably should be capable of handling both short strips of film and long strips which are advanced from a supply reel to a take-up reel.

The prior art neghold assemblies have generally been unable to meet all of these requirements. In general, the requirement of handling a wide variety of film sizes has led to the use of low cost interchangeable neghold assemblies. In order to attain the low cost, sacrifices have been made in the clamping and stability of the neghold assemblies.

FIGS. 2-6 illustrate a preferred embodiment of the improved neghold assembly of the present invention. This neghold assembly overcomes many of the disadvantages of the prior art neghold systems for general purpose printers, without requiring excessive cost.

Figure 2:
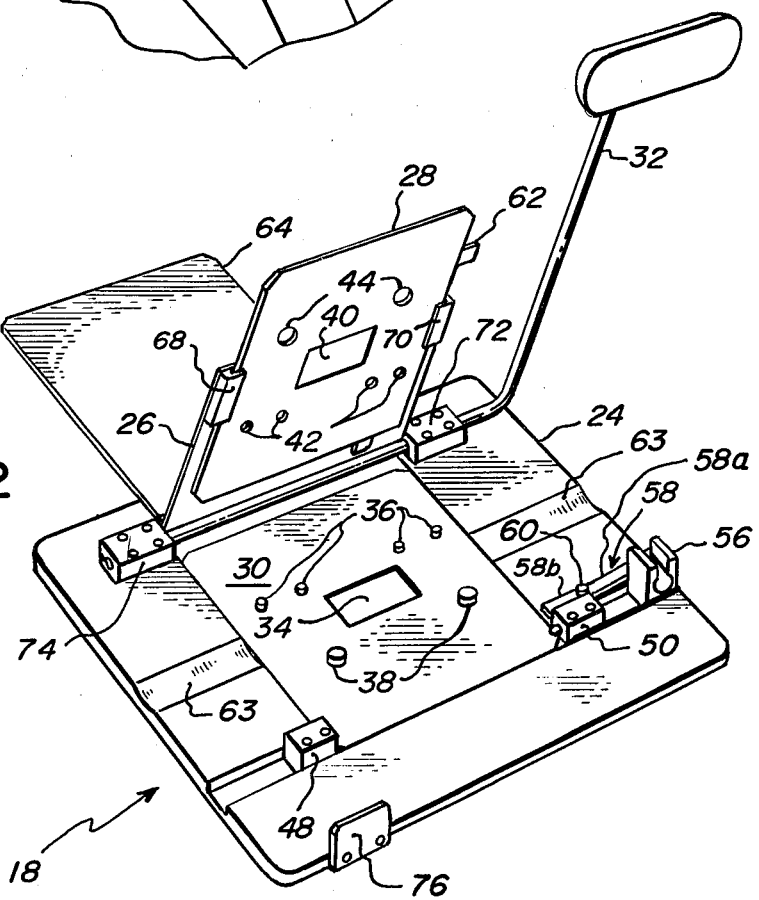
FIG. 2 is a perspective view of the neghold assembly of the present invention with the first and second aperture plates open.

The neghold assembly includes transport base 24, top insert holder 26, top and bottom aperture insert plates 28 and 30, and handle 32. As shown in FIG. 2, handle 32 is in an upward position and the plates 28 and 30 are separated. Top insert holder 26 and top aperture insert plate 28 are connected to handle 32 and pivot about an axis which is located near and parallel to the back edge of transport plate 24.

Each film size has a pair of top and bottom aperture insert plates 28 and 30 whose aperture depends upon the particular film size to be printed. When the operator desires to make a print from a different size film, he merely removes the present top and bottom aperture insert plates 28 and 30 from the top insert holder 26 and transport base 24 and substitutes a new pair of plates 28 and 30 with a different aperture.

As shown in FIG. 2, bottom aperture insert plate 30 includes an aperture 34, a plurality of fixed rear guiding pins 36 which locate the rear edge of the film, and a plurality of spring-loaded front guiding pins 38. Spring-loaded guiding pins 38 are movable in a direction essentially perpendicular to the direction of travel of the film in the neghold assembly. The purpose of the spring-loaded pins 38 is to accomodate variations in film width tolerances. It has been found that the width of film strips can vary depending upon humidity, age, storage, and the tolerances which were used in manufacture. The location of guiding pins 38 with respect to guiding pins 36 is selected so that the narrowest film strip for the desired aperture size 34 will be held. If a wider strip is being used, pins 38 are urged slightly outward toward the front of the neghold assembly, but continue to apply a holding force to the edge of the film strip to positively hold the strip between pins 36 and 38.

The spring force of spring-loaded pins 38 is selected so that the film is actually buckled slightly in the center. This causes the bottom of the film to be lifted slightly off of the surface of bottom aperture insert plate 30. Since the printer shown in FIG. 1 requires the emulsion of the film to be on the bottom side, the lifting of the film due to the force applied by the spring-loaded pins reduces the chance of scratching damage to the emulsion.

Another important feature of pins 36 and 38 is the arrangement of the pins around aperture 34. As shown in FIG. 2, two of the stationary pins 36 and one of the spring-loaded pins 38 are arranged in a triangular pattern around each end of aperture 34. This ensures that the film will always be held by at least two stationary pins and one spring-loaded pin, whether the first frame of the film is being printed, the last frame is being printed, or some frame in between. The triangular orientation tends to prevent the film from becoming skewed with respect to aperture 34, even when the first or last frame is being printed.

As shown in FIGS. 2, 3, and 4, top aperture insert plate has an aperture 40 which mates with (and is slightly larger than) aperture 34 of bottom aperture insert plate 30. In addition, top aperture insert plate 28 includes holes 42 which mate with pins 36 and holes 44 which mate with pins 38. Holes 42 and 44 are sufficiently large to permit close clamping of aperture plate 28 over plate 30. In the case of holes 44, they are sized large enough to accomodate the full range of possible movement of spring-loaded pins 38.

FIG. 3 shows the neghold assembly with handle 32 pivoted down to its clamping position in which top and bottom plates 28 and 30 are clamped together to hold film strip 46. Detent blocks 48 and 50 include spring-loaded plungers 52 and 54, respectively, which assist in holding plate 30 in place. Handle 32 rests in handle catch 56 when it is in its clamping position.

In the preferred embodiment of the present invention shown in the Figures, film 46 may be moved and positioned by the operator without removing the neghold assembly from the print gate and without having to lift handle 32 to an open position. This feature is provided by insert lift lever 58, which pivots about pivot pin 60. Right end 58a of insert lift lever 58 extends below handle 32, while left end 58b is positioned below insert lift tab 62 on the side of top insert plate 28.

Normally when handle 32 is in its clamping position, right end 58a of insert lift lever 58 is immediately below handle 32 and left end 58b is essentially flat against the top surface of transport base 24. If handle 32 is further depressed from the clamping position, the right end 58a moves downward, and left end 58b moves upward. This applies some upward force to insert lift tab 62 and therefore to top plate 28, thereby causing a slight separation between plates 28 and 30. This separation is sufficient to release the clamping of film 46 and permit adjustment of the position of film 46 by the operator. When the downward pressure on lever 32 is released, it returns to its clamping position, and film 46 is again clamped securely. Indexing or moving the film 46 by the operator, therefore, can be accomplished with a one-handed operation by depressing handle 32 with a palm or wrist, while grasping film 46 with the fingers of the same arm.

In the preferred embodiment shown in the Figures, a finger slot or groove 63 is provided in the top surface of transport base 24. Finger slot 63 underlies the normal path of film across transport base 24, and allows the operator to easily grasp or push film 46. This is particularly advantageous when short strips of film are being handled, since it is sometimes difficult to grasp or push short strips of film if finger slot 63 is not provided.

Another important advantage of the present invention is that the same pair of aperture insert plates can be used for both left to right and front to rear printing. Plates 28 and 30 are preferably square, with apertures 34 and 40 being positioned in the center of the respective plates. By removing plates 28 and 30, rotating them by 90°, then reinserting them into transport base 24 and top insert holder 26, the direction of film orientation may be changed by 90° without requiring a different neghold assembly, or a different set of insert plates. FIG. 4 illustrates the front to rear printing orientation of film 46.

As illustrated in FIG. 4, the neghold assembly includes a film support plate 64 which supports the film as it moves out the back side of neghold assembly. In addition, in preferred embodiments of the present invention, film support plate 64 provides a second important function. The length of support plate 64 is selected so that when the neghold assembly is moved to its most forward position over the preview station, support plate 64 covers the hole which exists at the print gate. This prevents dust and other particles from geing drawn into the printer through the print gate. In a preferred embodiment, support plate 64 is a partially transmitting plexiglass plate which permits some transmission of light to the LATD sensors of printer 10. This is advantageous if the LATD sensors are CdS photocells or other photosensors having a very long photoresponse time. Prolonged exposure to total dark conditions will cause erroneous signals to be produced by the LATD sensors. For that reason, support plate 64 permits some light to reach the sensors to maintain them in a light-sensitive condition.

As shown in FIG. 4, top aperture plate 28 has a second insert lift tab 62' which engages insert lift lever 58 when top insert plate 28 is orientated in the front to rear configuration. This permits the film positioning function to be performed in either film orientation. Tab 62' is obscured by top insert holder 26 in FIGS. 2 and 3 due to the orientation of top insert plate 28.

FIGS. 5A and 5B show top and bottom views of the neghold assembly with the top and bottom aperture insert plates 28 and 30 removed. As shown in FIG. 5A, top insert holder 26 includes an inverted U-shaped member 66 and guides 68 and 70. The top insert plate 28 (not shown in FIG. 5A) is inserted and held between the bottom surface of member 66 and guides 68 and 70. The back edge of member 66 is connected to handle 32, which extends through pivot blocks 72 and 74.

In a preferred embodiment, pivot blocks 72 and 74 are "seizure type" pivot blocks which hold handle 32 in whatever position it has assumed. As a result, an infinite number of positions are possible for handle 32.

Also shown in FIG. 5A is the push bar or handle 76 which is attached to the front left edge of transport plate 24. The operator may slide the neghold assembly into and out of place by grasping handle 76.

One recurring problem with the prior art neghold assemblies was reliable sliding on guide rails of the photographic printer. The neghold assembly of the present invention, as illustrated in the bottom view shown in FIG. 5B, overcomes these problems. First, the sliding mechanism on the neghold assembly includes finger-like slides 78 and 80, which engage rails 22 and 20, respectively, of printer 10. Slides 78 and 80, which are preferably a low friction plastic material, only engage the mating parts of rails 22 and 20 by approximately 1/16". The remainder of the material of slides 78 and 80 acts as a release spring which applies an effective downward force to the neghold assembly to hold the neghold assembly against rails 20 and 22 and therefore in optical alignment. Adjustment screws 82 permit movement of slide 78 to adjust the spacing between slides 78 and 80 in order to accomodate variations in the spacing of rails 20 and 22. Strips 84 and 86 of a low friction material such as Teflon are inlaid in the bottom surface of transport base 24. These inlaid low friction strips further reduce any binding or friction which may occur as the neghold assembly slides on guide rails 20 and 22 of printer 10.

FIG. 6 is a sectional view showing insert lift lever 58, pivot pin 60, and strip 82, which happens to run directly beneath pivot pin 60 in the specific embodiment shown in the Figures. As illustrated in FIG. 6, pivot pin 60 is a pin which has been press-fitted into transport plate 24. Insert lift lever 58 is bent so that its left end 58b normally lies flat on the top surface of transport base 24 while the right end angles somewhat upward to a position beneath the handle 32 (not shown in FIG. 6). When the handle 32 is depressed from the clamping position, insert lift lever 58 pivots about pivot pin 60 so that the left end 58b is raised from the surface of transport base 24. As previously described, this causes top plate 28 to be slightly lifted, thereby releasing clamping plates 28 and 30 without requiring the removal of the neghold assembly from the print gate and the opening of plates 28 and 30 by lifting handle 32.

For proper performance of the neghold assembly, the various components must be stable mechanically. In particular, the base 24 and plates 28 and 30 must be stable in order to permit reliable clamping of the film. The preferred embodiment, transport base 24 is a cast aluminum tooling plate of about $\frac{1}{4}$" thickness and insert plates 28 and 30 are $\frac{1}{8}$" ground flat low carbon steel.

Reliable clamping of the film is further assured in the preferred embodiment of the invention by top insert holder 26. In particular, the inverted U-shaped member 66, together with guides 68 and 70, act as a leaf-spring type holder which applies force downward on top insert plate 28 at approximately the center of the left and right edges of top insert plate 28. When the left to right print orientation is used, the force is applied directly over the center line of the film path. FIG. 7 shows a side view of the neghold assembly and illustrates how U-shaped member 66 acts as two leaf-springs to apply the desired force. Guides 68 and 70 permit some pivoting of top insert plate 28 while it is being held so that when top and bottom insert plates 28 and 30 are clamped together, they are parallel to one another.

Another important consideration is that the neghold assembly should not scratch the film if at all possible. Because of the diverse materials of the transport base and insert plates 28 and 30, it is difficult to develop a finish which is smooth and low friction and which is the same for both aluminum and steel. It has been found that a coating of Impreglon 218 produces a finish which is hard, durable, low friction, and pleasing esthetically.

Although the specific embodiment shown in the Figures has described top aperture insert plates which are metal and which have an aperture 40 which mates with aperture 34 of bottom aperture insert plate 30, the present invention may also be used for printing when the top plate contains a glass plate. In the present invention, only a single glass top plate is required, while in other prior art neghold assemblies, glass top plate which is duplicated for every film size is required. In this embodiment, a bottom aperture insert plate with no guiding pins is generally used.

In conclusion, the improved neghold assembly of the present invention overcomes the problems associated with the prior art neghold assemblies for general purpose printers. First, it provides an improved and more reliable film clamping and assures film plate flatness. Second, it uses low cost interchangeable aperture insert plates, which in turn permit the use of a more sturdy and stable neghold assembly while still maintaining a reasonable cost. Third, it provides film one-handed indexing without opening the neghold. Fourth, the spring-loaded guide assembly provides better holding of the film in the neghold assembly, particularly when the insert plates are not clamped together. Fifth, the present invention provides a film support plate which provides needed support to the film when the front to rear film orientation is being used and also protects the LATD sensors and the lenses from dirt when the neghold assembly is over the preview station. Sixth, the neghold assembly has improved a more reliable slide action. Seventh, the neghold assembly preferably uses a hard, durable and low friction coating which minimizes film scratching.

Although the present invention has been described with reference to preferred embodiments, workers skilled in the art will recognize that changes may be made in form and detail without departing from the spirit and scope of the invention. For example, although the present invention has been described in the context of use with a particular photographic printer, other printers may also be used with the neghold assembly of the present invention. The particular dimensions and configurations of the neghold assembly may, of course, differ somewhat depending upon the particular printer with which it is to be used.

What is claimed is:

1. A neghold assembly for use in a photographic printer, the neghold assembly comprising:
    first and second insert plates having mating light transmitting portions;
    a transport base for holding the first insert plate;
    top insert holder means for holding the second insert plate;
    handle means operably connected to the top insert holder means for selectively pivoting the top insert holder means to a clamping position in which the first and second aperture insert plates are clamped together to hold photographic film and to open positions in which the first and second insert plates are separated; and
    insert lift lever means operably engaging the handle means and the second insert plate for lifting the second insert plate to release clamping of the first and second insert plates when the handle means is depressed beyond the clamping position, thereby permitting adjustment of film position without pivoting the second insert plate to an open position.

2. The neghold assembly of claim 1 wherein light transmitting portion of the first insert plate comprises an aperture, and wherein the first insert plate includes:
    first guiding means positioned on one side of the aperture in the first insert plate; and
    second guiding means positioned on an opposite side of the aperture, the first and second guiding means defining a film path across a top surface of the first insert plate and over the aperture in the first insert plate.

3. The neghold assembly of claim 2 wherein the first guiding means comprise a plurality of stationary guiding pins attached to the top surface of the first insert plate and essentially parallel to the film path; and wherein the second guiding means comprises a plurality of spring-loaded guiding pins connected to the top surface of the first insert plate and essentially parallel to the film path, the spring-loaded pins being movable in a direction essentially perpendicular to the film path.

4. The neghold assembly of claim 3 wherein the second insert plate includes receiving holes which mate with the first and second guiding means when the first and second insert plates are clamped together.

5. The neghold assembly of claim 1 wherein the first and second insert plates are essentially square plates having their light transmitting portions in the center of the plates, thereby permitting a different orientation of the film path by rotating the first and second insert plates by 90°.

6. The neghold assembly of claim 1 wherein the photographic printer includes guide rails and wherein the transport plate includes guide rail engaging means for engaging the guide rails to permit sliding insertion of the neghold assembly from a position in front of a print gate of the printer to a position over the print gate of the printer.

7. The neghold assembly of claim 6 wherein the guide rail engaging means comprises:
    first and second spring finger slide means attached to a bottom surface of the transport base and engaging the guide rails, the spring finger slide means applying a downward force to the transport base when engaging the guide rails.

8. The neghold assembly of claim 7 wherein the spring finger slide means comprises a low friction material.

9. The neghold assembly of claim 8 and further comprising a low friction material on the bottom surface of the transport base where the bottom surface of the transport base contacts the guide rails.

10. The neghold assembly of claim 6 and further comprising:
    film support means attached to the transport base and extending rearwardly from the rear edge of the transport base.

11. The neghold assembly of claim 10 wherein the film support means extends rearwardly by a distance sufficient to cover the print gate when the neghold assembly is in its most forward position in the printer along the guide rails.

12. The neghold assembly of claim 11 wherein the film support means comprises a light-transmitting plate.

13. The neghold assembly of claim 1 wherein the top insert holder means comprises:
    a U-shaped member having a rear edge connected to the handle means and first and second forward extending arms; and
    first and second holding means attached to the first and second arms for holding the second insert plate.

14. The neghold assembly of claim 1 wherein the transport base top surface and the first and second insert plates are coated with a low friction coating.

15. The neghold assembly of claim 14 wherein the low friction coating Impreglon 218.

16. The neghold assembly of claim 1 and further comprising:
    handle catch means attached to the transport base for holding the handle means in its clamping position.

17. The neghold assembly of claim 16 wherein the insert lift lever means comprises:
    a lever having a first end positioned beneath the handle means and a second end positioned beneath an edge of the second insert plate, and being pivoted about a pivot point between the first and second end, whereby downward movement of the handle means from its clamping position causes downward movement of the first end and upward movement of the second end of the lever.

18. The neghold assembly of claim 1 wherein the second insert plate is a glass plate.

19. The neghold assembly of claim 1 and further comprising:

seizure-type pivot blocks for pivotably holding the handle means.

20. A neghold assembly for use in a photographic printer, the neghold assembly comprising:
- first and second insert plates having mating apertures corresponding to a desired film size;
- a transport base for holding the first aperture insert plate;
- top insert holder means for holding the second aperture insert plate;
- handle means operably connected to the top insert holder means for selectively pivoting the top insert holder means to a clamping position in which the first and second insert plates are clamped together to hold photographic film and to open positions in which the first and second aperture insert plates are separated;
- a plurality of stationary guiding pins attached to a top surface of the first aperture insert plate and positioned on one side of the aperture in the first aperture insert plate;
- a pluarality of spring-loaded guiding pins connected to the top surface of the first aperture insert plate and positioned on an opposite side of the aperture, the stationary guiding pins and the spring-loaded guiding pins defining a film path across the top surface of the first aperture insert plate and over the aperture in the first aperture insert plate, the spring-loaded guiding pins being movable in a direction essentially horizontal and transverse to the film path; and
- a plurality of receiving holes in the second aperture insert plate which mate with the stationary guiding pins and the spring-loaded guiding pins when the first and second aperture insert plates are clamped together.

21. The neghold assembly of claim 20 wherein the first and second aperture plates are essentially square plates having their apertures in the center of the plates, thereby permitting a different orientation of the film path by rotating the first and second aperture insert plates by 90°.

22. The neghold assembly of claim 20 wherein the spring-loaded guiding pins apply a compressive force to the film to lift the bottom surface of the film off the top surface of the first aperture insert plate.

23. The neghold assembly of claim 20 wherein at least two stationary guiding pins and one spring-loaded guiding pin are positioned proximate each end of the aperture in the first aperture insert plate.

24. The neghold assembly of claim 20 and further comprising:
- slot means formed in the top surface of the transport base along a film path over the top surface.

25. A neghold assembly for use in a photographic printer, the neghold assembly comprising:
- top and bottom insert plates having mating light transmitting portions;
- a transport base for holding the bottom insert plate;
- top insert holder means for holding the top insert plate, the top insert holder means comprising first and second forward extending leaf-spring arms and first and second insert-holding means attached to the first and second leaf-spring arms for holding the top insert plate; and
- handle means operably connected to the top insert holder means for selectively pivoting the top insert holder means to a clamping position in which the top and bottom insert plates are clamped together to hold photographic film and to open positions in which the top and bottom insert plates are separated.

26. The neghold assembly of claim 25 wherein the first and second leaf-spring arms apply a downward force to the top insert plate when in the clamping position.

27. The neghold assembly of claim 26 wherein the downward force is applied proximate the center of opposite edges of the top insert plate.

* * * * *